(12) United States Patent
Dicke

(10) Patent No.: US 6,585,309 B2
(45) Date of Patent: Jul. 1, 2003

(54) TONNEAU COVER WITH CONCEALED STORAGE COMPARTMENT

(75) Inventor: Terry Dicke, Elkhart, IN (US)

(73) Assignee: Penda Corporation, Portage, WI (US)

( * ) Notice: Subject to any disclaimer, the term of this patent is extended or adjusted under 35 U.S.C. 154(b) by 0 days.

(21) Appl. No.: 10/010,635

(22) Filed: Nov. 5, 2001

(65) Prior Publication Data

US 2003/0085585 A1 May 8, 2003

(51) Int. Cl.$^7$ .................................................. B60P 7/02
(52) U.S. Cl. .............................. 296/100.16; 296/100.1; 296/100.06
(58) Field of Search .................... 296/100.16, 100.18, 296/100.06, 100.07, 100.1, 100.09, 100.15, 100.17, 100.01, 37.6, 37.16; 224/404, 42.34, 42.33

(56) References Cited

U.S. PATENT DOCUMENTS

| | | | | |
|---|---|---|---|---|
| 3,909,060 A | * | 9/1975 | Katayama | 296/37.16 |
| 4,169,550 A | * | 10/1979 | Williams | 224/633 |
| 4,762,360 A | * | 8/1988 | Huber | 296/100.07 |
| 4,844,311 A | * | 7/1989 | Kalen | 206/387.15 |
| 4,848,824 A | * | 7/1989 | Smith et al. | 296/37.6 |
| 4,868,955 A | * | 9/1989 | Magnant et al. | 206/597 |
| 5,018,609 A | * | 5/1991 | Brenner | 206/225 |
| 5,213,390 A | * | 5/1993 | Borchers | 296/100.06 |
| 5,328,230 A | * | 7/1994 | Curchod | 296/37.1 |
| 5,382,068 A | * | 1/1995 | Simmons et al. | 296/24.1 |
| 5,407,067 A | * | 4/1995 | Cotter et al. | 206/312 |
| 5,566,980 A | * | 10/1996 | Fizer | 150/145 |
| 5,632,522 A | * | 5/1997 | Gaitan et al. | 296/100.06 |
| 5,868,453 A | * | 2/1999 | Steigner | 296/100.1 |
| 5,909,921 A | * | 6/1999 | Nesbeth | 296/100.1 |
| 5,938,263 A | * | 8/1999 | Barthelman | 296/37.6 |
| 5,951,095 A | * | 9/1999 | Herndon | 296/100.1 |
| 5,971,469 A | * | 10/1999 | Lund et al. | 296/100.01 |
| 6,042,173 A | * | 3/2000 | Nett | 296/100.06 |
| 6,070,775 A | * | 6/2000 | Tolley et al. | 296/37.5 |
| 6,183,035 B1 | | 2/2001 | Rusu et al. | |
| 6,217,102 B1 | * | 4/2001 | Lathers | 296/100.1 |
| 6,221,290 B1 | * | 4/2001 | Waddington et al. | 264/45.3 |
| 6,247,741 B1 | * | 6/2001 | Seel et al. | 296/37.16 |
| 6,340,194 B1 | * | 1/2002 | Muirhead et al. | 296/100.1 |

* cited by examiner

*Primary Examiner*—Kiran Patel
(74) *Attorney, Agent, or Firm*—Harness, Dickey & Pierce, PLC

(57) ABSTRACT

A pick-up truck having a bed with a front wall, two side walls, and a tailgate, has a tonneau cover installed over the bed. The tonneau cover comprises a set of interconnected rail members, a pair of cross members, and a flexible cover. The cover has a pocket attached to the underside for storage of items that are small, fragile or valuable. The pocket may be partitioned into smaller compartments for selective isolation of items from other items. The pocket is attached to the tonneau cover by stitches that are used along a perimeter of the cover.

11 Claims, 4 Drawing Sheets

TONNEAU COVER WITH CONCEALED STORAGE COMPARTMENT

FIELD OF THE INVENTION

The present invention relates to a device for enclosing the cargo area of a vehicle. More particularly, the present invention relates to a cover for the cargo area of a truck having a storage compartment included therein.

BACKGROUND OF THE INVENTION

Vehicles such as pick-up trucks having an open cargo area are useful for transporting a wide variety of cargo. However, cargo transported in these types of vehicles is susceptible to environmental exposure. Therefore, various tops, caps, and tonneau covers have been designed to cover the cargo area and limit the ingress of rain, sleet, snow and the like.

One cover design which has dramatically increased in popularity is the flexible or soft tonneau cover. This tonneau cover offers relatively low cost, ease of installation and reduced storage space when not in use. A soft tonneau typically includes a flexible cover releasably attached to interconnected frame members mounted on the top edge of a truck bed.

While soft tonneau covers limit the environmental exposure to the cargo area, other features remain desirable. In a typical tonneau cover, the enclosed cargo area forms one large compartment. This large compartment is useful for storage of large items and bulk materials. However, the large compartment is not well suited for storing small goods, fragile items, or valuable possessions. Therefore, it remains desirable to provide a soft tonneau cover which includes a compartment for the storage of small, fragile or valuable items.

SUMMARY OF THE INVENTION

It is a general object of the present invention to provide a soft tonneau cover for a truck cargo area, the tonneau cover including a storage compartment located on the underside of the cover for selectively retaining items.

In one form, the present invention includes a flexible tonneau cover including a first flexible sheet having a perimeter substantially corresponding to the perimeter of a cargo area, a plurality of fasteners attached around the perimeter of the flexible cover for attaching the cover to the cargo area, and a pocket formed on the underside of the flexible sheet for selectively retaining objects.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the present invention, its application, or uses.

Figure 1:
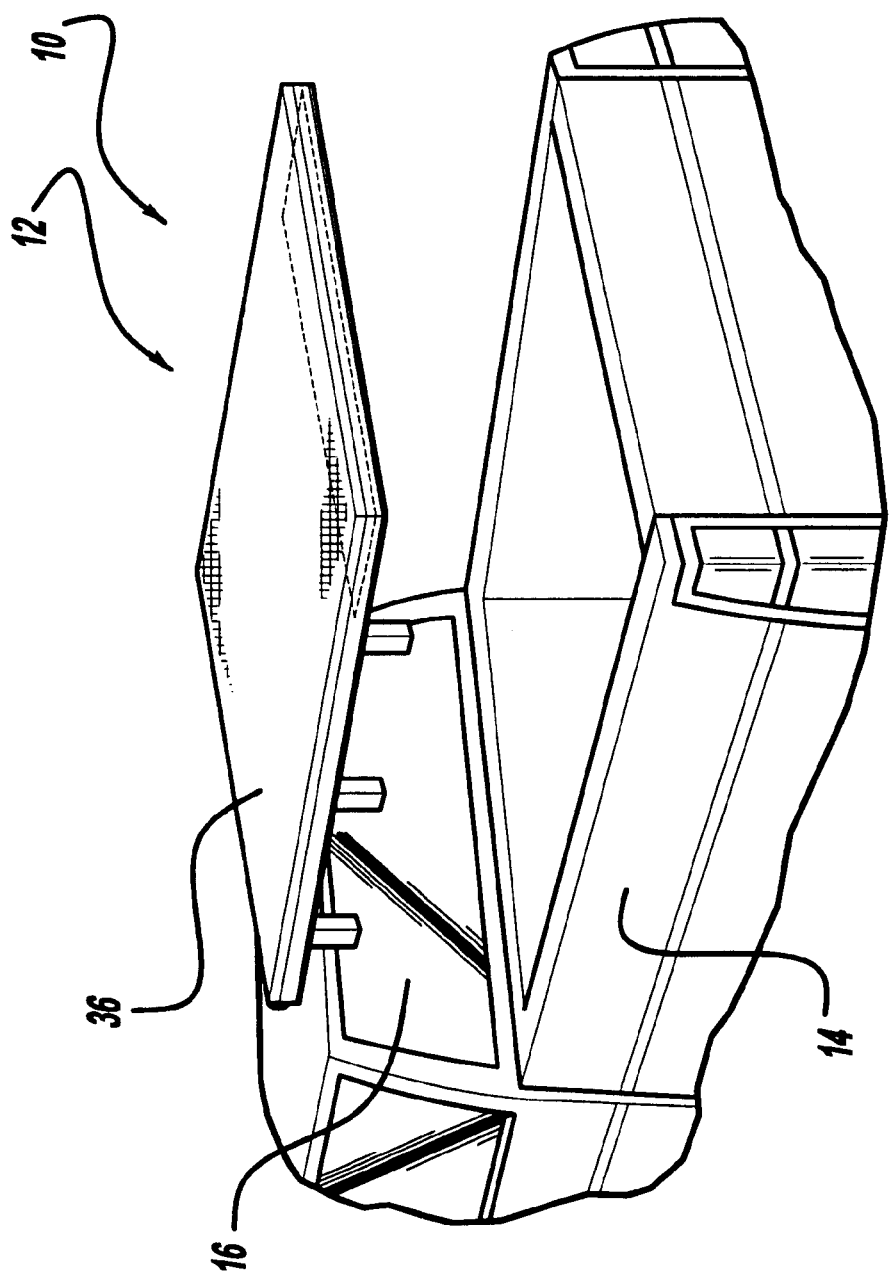
FIG. 1 is a perspective view of an exemplary vehicle including the apparatus of the present invention.
Figure 2:
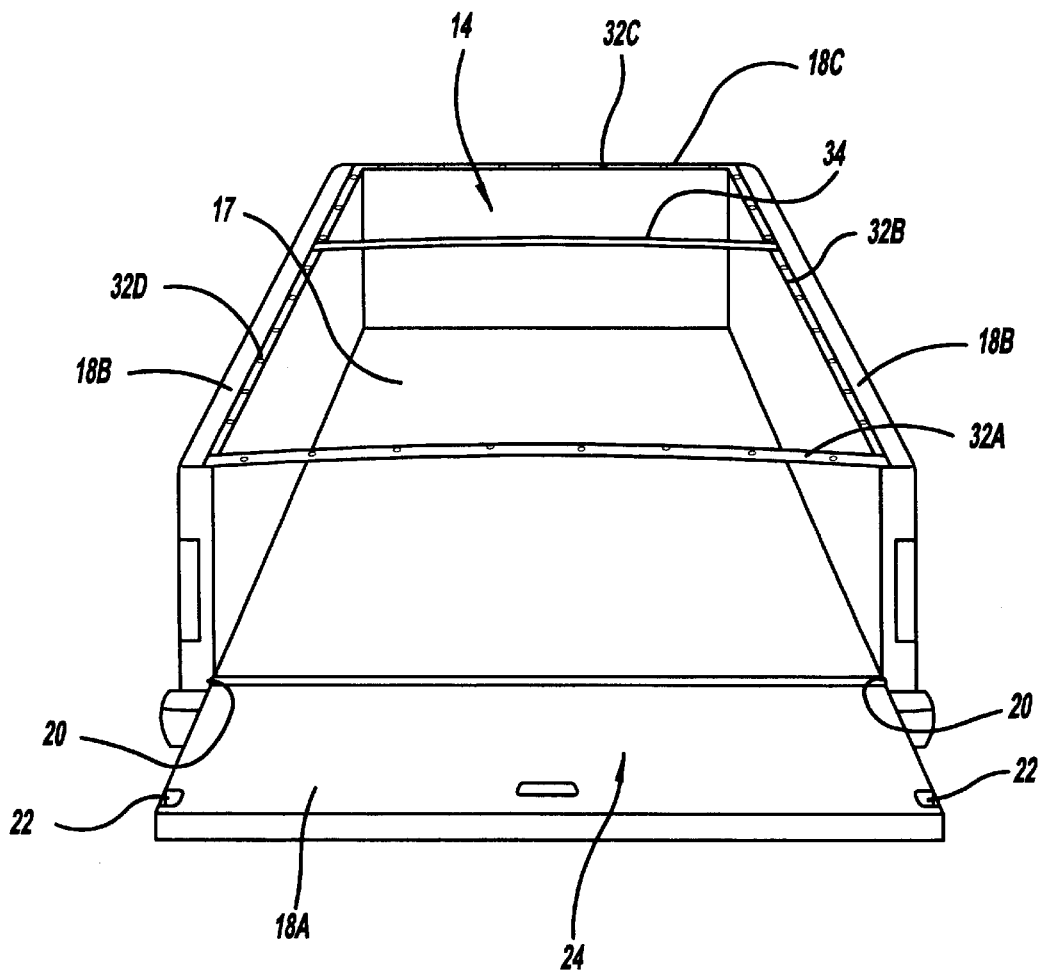
FIG. 2 is a perspective view of the cargo area of the exemplary vehicle of FIG. 1.

With reference to FIGS. 1 and 2, an exemplary motor vehicle 10 is shown equipped with the pocket tonneau cover 12 of the present invention extending over the cargo area 14. Cargo area 14 is located directly behind the passenger compartment 16 of motor vehicle 10 providing storage for goods and materials. Cargo area 14 of motor vehicle 10 is constructed in a box shape having a base 17 connected to four upwardly extending interconnected wall segments 18A, 18B, 18C and 18D. Motor vehicle 10 also includes a hinge 20 and a lock mechanism 22 connecting base 17 to wall segment 18A to form a liftgate assembly 24 which simplifies ingress to and egress from the cargo area 14. Wall segment 18A has been rotated to its lowered position in the illustration.

As is well known, cargo area 14 is often covered by a tarpaulin or other protective cover to limit the environmental exposure and prevent egress of the items in cargo area 14. As such, it is well known to provide a removable device that functions to enclose cargo area 14. This device, often embodied as a tonneau cover assembly, includes a set of rail segments 32A, 32B, 32C and 32D which interconnect to form a shape similar to the shape of cargo area 14. In the preferred embodiment, rail segments 32A and 32C are associated with shorter wall segments 18A and 18C, and segments 32B and 32D are associated with longer wall segments 18B and 18D. Additionally, the tonneau cover assembly includes cross members 34 which extend over cargo area 14 and connect longer rail segments 32B and 32D together. Third, the tonneau cover assembly includes a flexible cover 36 having releasable fasteners, (such as snaps 38 shown in FIG. 3), sewn around the perimeter to connect flexible cover 36 to rail segments 32A–32D to form an enclosure over cargo area 14.

Figure 3:
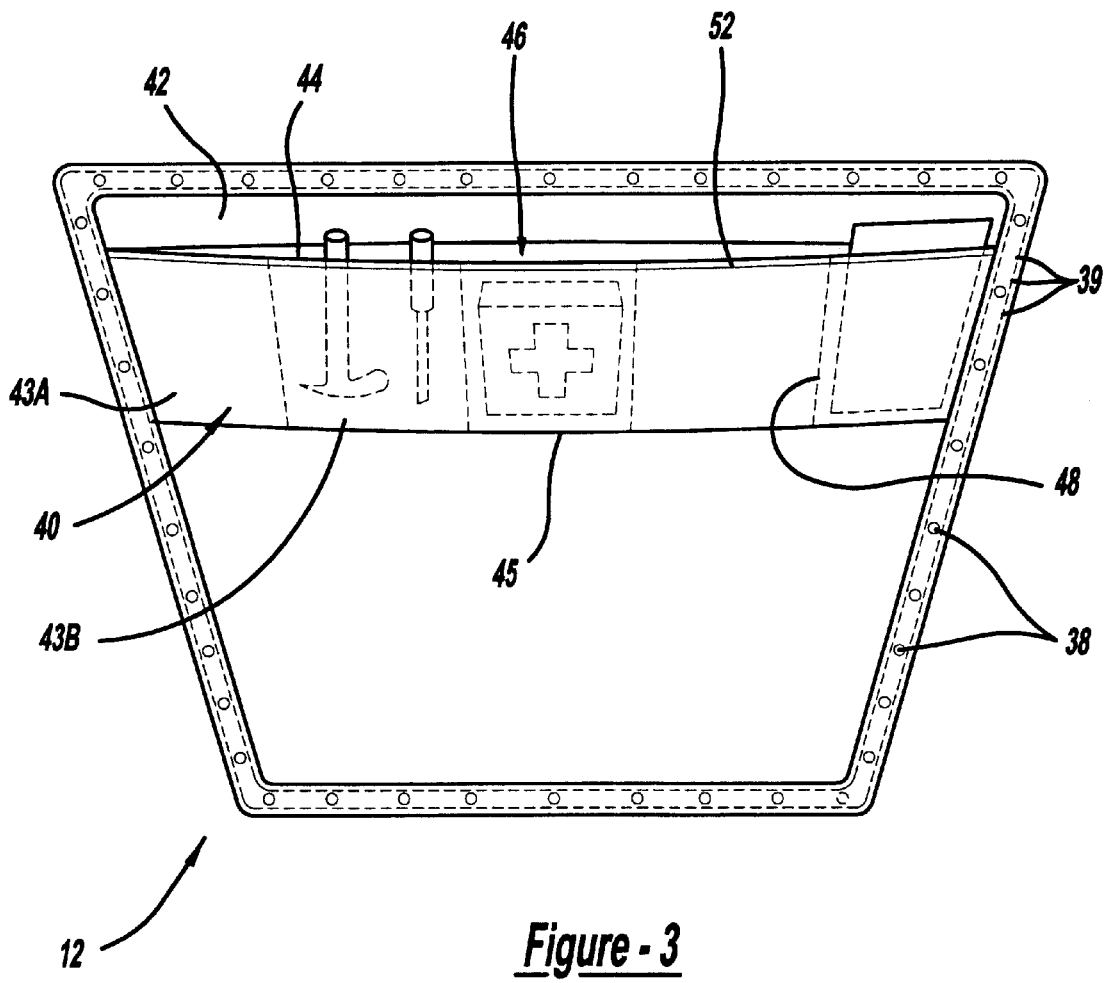
FIG. 3 is a perspective view of the underside of the apparatus of the present invention.
Figure 4:
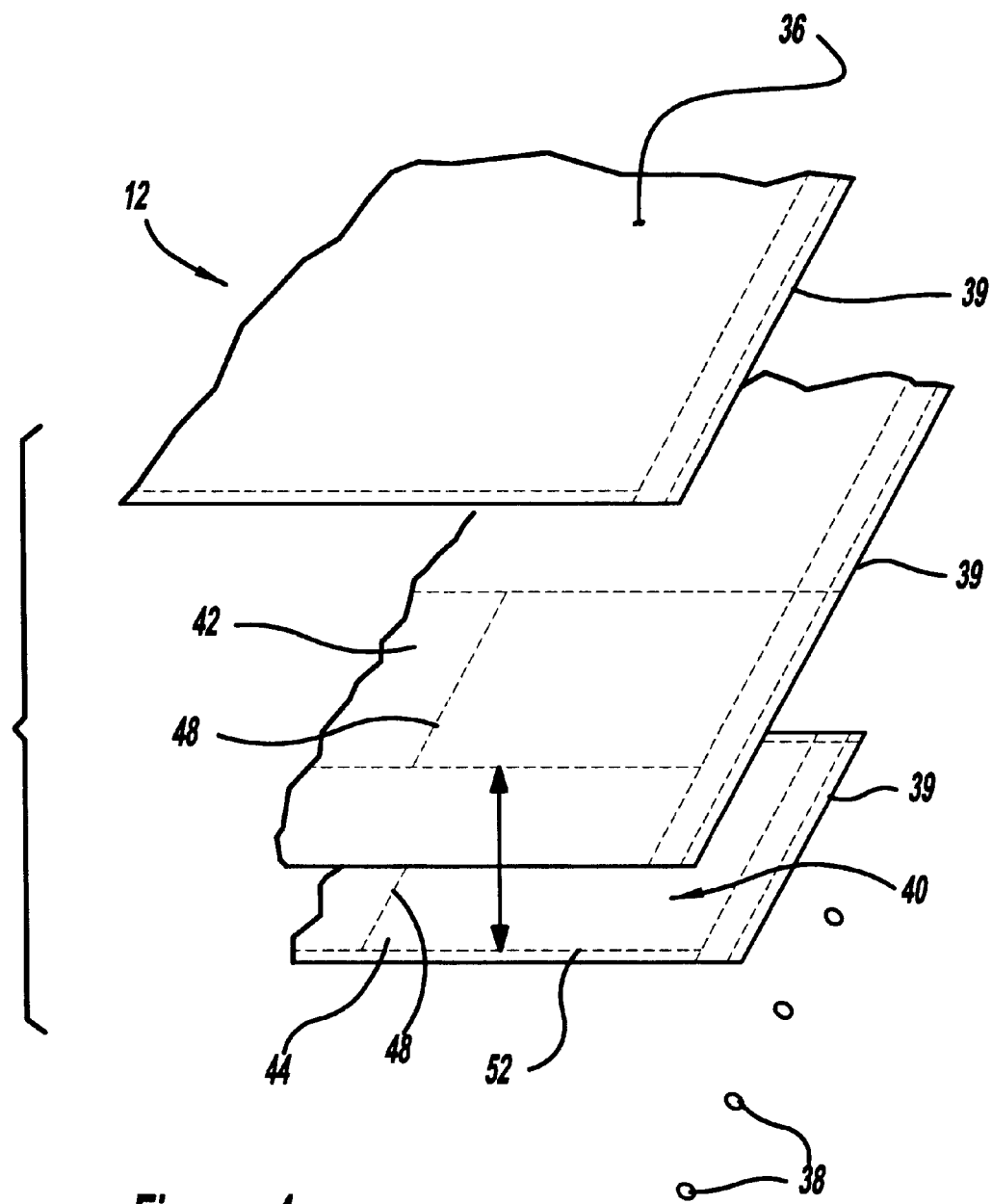
FIG. 4 is an exploded view of the present invention showing the construction of the pocket portion.

With reference to FIG. 3, the underside of the pocket tonneau cover 12 is shown in greater detail. Pocket tonneau cover 12 is generally rectangular in shape. However, it is understood that pocket tonneau cover 12 may embody many different shapes depending on the shape of the area sought to be enclosed.

Pocket tonneau cover 12 is releasably attachable to rail segments 32A–32D (FIG. 2) through the use of snaps 38. However, it is understood that other methods of releasable attachment, such as buttons, hook and loop fasteners and zippers may be used to secure the pocket tonneau cover 12 to rail segments 32A–32D. The edge of flexible cover 36 is folded over onto itself and secured by stitching 39. However, it is conceivable that other types of fastening devices such as adhesive or sonic weldment may be use in place of the stitching 39 to secure the edge of flexible cover 36. Snaps 38 are disposed through this doubled-over edge portion. Stitching 39 secures the two portions of the folded over material to provide additional material for the snaps 38 to be secured through.

In the present invention, a pocket 40 is attached to the underside of pocket tonneau cover 12. Pocket 40 is preferably constructed of two parts, backing portion 42 and cover portion 44. Cover portion 44 is attached to backing portion 42 to form pocket 40 and an aperture 46. Backing portion 42 and cover portion 44 may be formed from a continuous sheet of material folded onto itself or from two discrete pieces secured along mating edges.

Backing portion 42, constituting the main body of pocket 40, is preferably attached to the Underside of the pocket tonneau cover 12 through the use of the same stitching 39 located around the perimeter of the cover to envelop snaps 38. The use of stitching 39 allows pocket 40 to be undetectable when pocket tonneau cover 12 is installed over cargo area 14. However, it is conceivable that other types of fastening devices such as adhesive or sonic weldment may be use in place of the stitching 39 to secure pocket 40 to the underside of pocket tonneau cover 12. Also, it is conceivable that pocket 40 may be secured to pocket tonneau cover 12 at other locations.

It should be noted that the use the additional stitching or other external fasteners not associated with a typical tonneau cover assembly would raise suspicion of the presence of pocket 40, thus eliminating the obscurity of the pocket. Further, additional stitching and/or fasteners may promote leaks. Nonetheless, it is conceivable that other methods of attachment may be used to attach pocket 40 to the underside of pocket tonneau cover 12. For example, pocket 40 may be secured to cover 36 (FIG. 1) through the use of adhesives. However, the use of adhesives may lead to decreased durability of the cover assembly.

Pocket 40 of the present invention may be constructed to correspond to the size of the items that are desired to be stored. In the preferred embodiment of the present invention, pocket 40 is constructed with a depth of approximately 1 foot and a width substantially similar to the width of cargo area 14. The size of pocket 40 as shown is designed to hold small tools, paperwork and other similar size items. It is also contemplated that the depth of the pocket 40 may be increased if storage of larger items such as fishing poles or other elongated items are desired to be stored.

The location of pocket 40 and aperture 46 may also be constructed to correspond to the devices that are desired to be stored. In the preferred embodiment of the present invention, pocket 40 is located in the rear of cargo area 14 and aperture 46 is located adjacent to liftgate assembly 24. This orientation is preferred for storing items that are used often or used only in the rear portion of the vehicle, such as hand tools or towing ropes. It is conceivable that pocket 40 may be positioned adjacent to a side of the cargo area or adjacent to front of the cargo area for storage of goods that are not often utilized or used at a specific location on the vehicle, such as a wrench for removing lug nuts.

As stated above, a goal of the present invention is to disguise pocket 40. Specifically, when an item is stored inside pocket 40, the exterior of the tonneau should look unchanged. In constructing pocket 40, it is desirable to have side 45 of pocket 40 opposite aperture 46 less taught than the side adjacent the aperture 46. Desirably, when the pocket is in use, side 45 opposite of the aperture 46 angles down under the weight of the items stored therein instead of remaining adjacent pocket tonneau cover 12 which could alert onlookers to the presence of pocket 40 by observing an outline of articles stored therein. In order to promote this, cover portion 44 is preferably formed in the shape of a trapezoid (having two parallel sides of differing widths for increasing the slack of side 45 and two oppositely angled sides connecting them). In this configuration, side 45 will hang lower than the side containing aperture 46. This configuration also promotes retention of items within pocket 40 through gravity.

In a second preferred embodiment, pocket 40 is subdivided by a series of releasable or permanent fasteners 48 that divide the pocket 40 into smaller pockets 43A, 43B, 43C, etc. Releasable fasteners 48 are preferably oriented to extend from aperture 46 to side 45. However, it is understood that releasable fasteners 48 may be oriented lengthwise or in other configurations to partition the pocket 40 into smaller differently oriented pockets.

Releasable fasteners 48 of the present invention are preferably of the hook and loop type, having one part of releasable fastener 48 connected to the backing portion 42 and the other portion of the releasable fastener 48 connected to the cover portion 44. In the present embodiment, the hook and loop fasteners are of the strip variety and are sewn to the backing portion 42 and cover portion 44 (but not all the way through cover 36). It is understood that hook and loop fasteners may be secured using adhesive or other means of attachment.

In alternate embodiments of the present invention, it is foreseeable that many different types of releasable fasteners may be used to divide pocket 40 into smaller pockets 43A, 43B, 43C, etc. and not depart from the scope of the invention. Some examples of other types of fasteners are stitches, zippers, buttons and snaps.

In a third embodiment of the present invention, pocket 40 has an aperture 46 capable of selectively closing pocket 40. A mechanism 52 is therefore provided for closing the aperture 46 of pocket 40 of the present invention. The preferred mechanism 52 for closing aperture 46 of the present invention is hook and loop fasteners. The fasteners are disposed along the face of backing portion 42 and cover portion 44 which form aperture 46 of pocket 40. It is also preferred that the hook and loop fasteners be sewn to the backing portion 42 and cover portion 44. It is also contemplated that other types of releasable fasteners may be used to close pocket 40 of the present invention. Some types of releasable fasteners include, zippers, snaps, buttons and spring biased hinges.

The material of which the present invention is preferably constructed is a fabric backed vinyl material. This material is relatively inexpensive, flexible, resilient, water resistant and environmentally stable. It is conceivable that different types of materials may be used to construct the present invention and not depart from the scope of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for enclosing a cargo area of a motor vehicle, the apparatus comprising:
   a flexible sheet having a seam bound by stitching formed therein; and
   a pocket member secured to said flexible sheet by said stitching.

2. The apparatus of claim 1, wherein said pocket member is substantially unobservable from one side of said flexible sheet.

3. The apparatus of claim 2, wherein said pocket member is attached to said flexible sheet at points around a perimeter of said flexible sheet.

4. The apparatus of claim 3, wherein said flexible sheet includes said stitching along said perimeter.

5. A tonneau cover comprising:
   a flexible sheet including a seam bound with a sonic weld along a perimeter of said flexible sheet; and a pocket member attached to said flexible sheet by said sonic weld.

6. A tonneau cover comprising:

a flexible sheet including a seam bound with adhesive formed along a perimeter of said flexible sheet; and a pocket member attached to said flexible sheet by said adhesive.

7. The apparatus of claim 1, wherein said pocket member further comprises a backing portion and a cover portion.

8. The apparatus of claim 7, wherein said pocket member further comprises a plurality of fasteners connected between said backing portion and said cover portion to partition said pocket member into compartments.

9. The apparatus of claim 1, wherein said pocket member is adjacent to a rear of the cargo area.

10. The apparatus of claim 1, wherein said pocket member is adjacent to a side of the cargo area.

11. The apparatus of claim 1, wherein said pocket member is adjacent to a front of the cargo area.

* * * * *